United States Patent
Sherry

(10) Patent No.: US 9,358,865 B1
(45) Date of Patent: Jun. 7, 2016

(54) FLYWHEEL-POWERED VEHICLE

(71) Applicant: Raymond C. Sherry, Cleburne, TX (US)

(72) Inventor: Raymond C. Sherry, Cleburne, TX (US)

(*) Notice: Subject to any disclaimer, the term of this patent is extended or adjusted under 35 U.S.C. 154(b) by 0 days.

(21) Appl. No.: 14/447,860

(22) Filed: Jul. 31, 2014

Related U.S. Application Data

(60) Provisional application No. 61/958,560, filed on Jul. 31, 2013.

(51) Int. Cl.
| | |
|---|---|
| B60G 17/06 | (2006.01) |
| B60W 30/04 | (2006.01) |
| F16F 15/00 | (2006.01) |
| F16F 15/30 | (2006.01) |
| B60K 6/10 | (2006.01) |
| F16C 15/00 | (2006.01) |

(52) U.S. Cl.
CPC .......... B60K 6/105 (2013.01); B60G 17/06 (2013.01); B60W 30/04 (2013.01); F16C 15/00 (2013.01); F16F 15/30 (2013.01)

(58) Field of Classification Search
CPC ........ B60G 17/06; B60W 30/04; F16F 15/00; F16F 15/30
USPC .......................................................... 701/38
See application file for complete search history.

(56) References Cited

U.S. PATENT DOCUMENTS

| | | | |
|---|---|---|---|
| 4,498,015 A | 2/1985 | Gottfried | |
| 4,626,696 A | 12/1986 | Maucher et al. | |
| 5,931,249 A * | 8/1999 | Ellis | B60K 1/02 180/165 |
| 5,995,895 A | 11/1999 | Watt et al. | |
| 6,024,667 A | 2/2000 | Krohm et al. | |
| 6,232,671 B1 | 5/2001 | Gottfried, Jr. | |
| 7,540,346 B2 * | 6/2009 | Hu | B60K 6/105 180/165 |
| 2004/0262062 A1 * | 12/2004 | Berbari | B60K 6/105 180/165 |
| 2014/0305388 A1 * | 10/2014 | Gay | B60W 10/02 123/2 |

* cited by examiner

*Primary Examiner* — Mussa A Shaawat
*Assistant Examiner* — Yazan A Soofi
(74) *Attorney, Agent, or Firm* — Roger N. Chauza, PC

(57) ABSTRACT

A flywheel operated vehicle. The engine drives the flywheel using a differential axle, while also driving a pair of other differentials each of which is connected to a respective drive wheel. The rotation of half shafts of the pair of differentials are controlled to determine the extent of power transferred from the flywheel to the drive wheels during acceleration, and determines the power transferred from the drive wheels to the flywheel during deceleration of the vehicle. The flywheel can be tilted about a roll axis of the vehicle to counteract roll tendencies of the vehicle when turning a sharp corner.

18 Claims, 4 Drawing Sheets

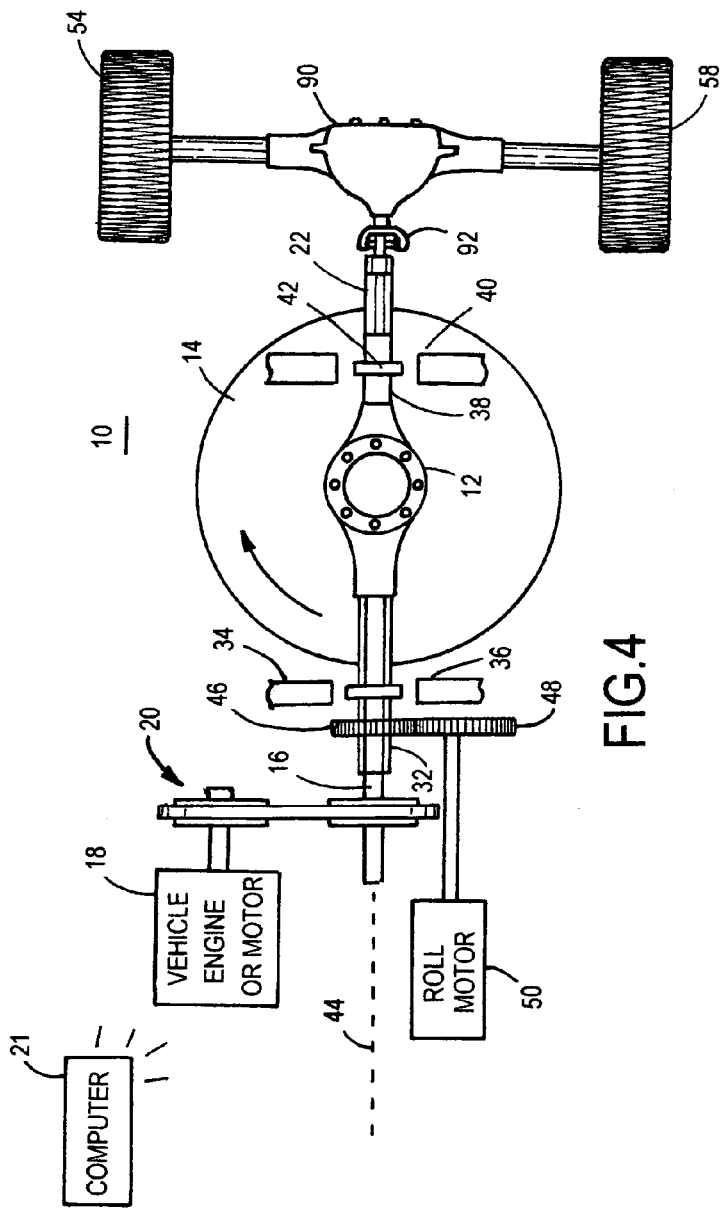
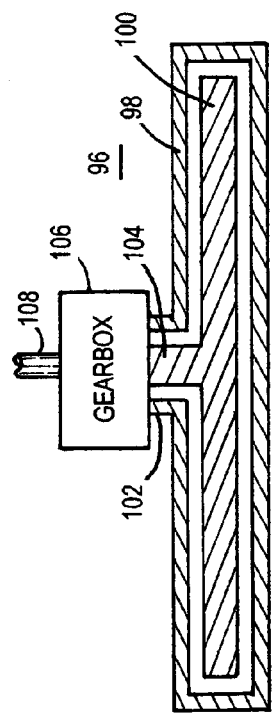
FIG.4
FIG.5

FLYWHEEL-POWERED VEHICLE

RELATED APPLICATION

This non-provisional patent application claims the benefit of U.S. provisional patent application filed Jul. 31, 2013 and assigned Ser. No. 61/958,560.

TECHNICAL FIELD OF THE INVENTION

The present invention relates in general to power sources for vehicles, and more particularly to flywheels for powering vehicles.

BACKGROUND OF THE INVENTION

The internal combustion engine has been a great innovation to provide rotary power for driving many different types of machines. Gasoline powered engines of this type were developed in the 1860's to power early machines. Even gasoline was not readily available at that time to make the internal combustion engine widely used. The internal combustion is today the mainstay for powering automobiles and other vehicles. Most engines employ an internal flywheel to smooth out the power delivery from the engine to the load. In other words, the typical engine flywheel stores kinetic energy during engine ignition cycles, and releases the energy to the load during other engine cycles.

What has not been developed commercially to date is a technique to power vehicles using flywheels not only to smooth out the delivery of power to the wheels, but also to power the car during intervals where the engine power may be insufficient, such as when accelerating a car equipped with a small horsepower engine from a stopped or idle condition to full speed. While flywheels have been used in vehicles for experimental purposes, the full extent of flywheels has not yet been exploited.

From the foregoing, a need exists for a flywheel system adapted for use with vehicles to provide an efficient and cost effective temporary supply of power. A further need exists for a flywheel system that not only supplies power to a vehicle to drive the wheels during periods of acceleration, but also to receive power from the vehicle during periods of deceleration and store such power for later use. Another need exists for the use of a flywheel to stabilize the vehicle during turning. A further need exists for the flywheel to be brought off line and spun up again to operating speed while the engine is delivering full power to maintain a desired acceleration.

SUMMARY OF THE INVENTION

In accordance with the principles and concepts of the invention, there is disclosed a flywheel operated vehicle that provides substantial torque to the vehicle that can be used when the vehicle engine cannot deliver the current demand for power.

In accordance with one feature of the invention, the flywheel rotates about a vertical axis and is located low on the vehicle to lower the center of gravity, so as not to interfere with the turning of the vehicle due to the gyroscopic effect of the rotating flywheel.

In accordance with another feature of the invention, the main differential drives a respective differential associated with each drive wheel. The differentials associated with the drive wheels each have a half shaft connected to the respective drive wheel, and other half shafts that are controlled by a computer to control the transfer of energy to and from the flywheel.

In accordance with another aspect of the invention, the extent of rotation of the half shafts of the differentials associated with the drive wheels is controlled by halting relation thereof to maximize the power transferred from the flywheel to the drive wheels. The controlled half shafts can also be connected by clutch apparatus to drive other equipment to use energy efficiently.

In accordance with yet another feature of the invention, the flywheel can be taken off line once it has expended its available kinetic energy, and spun up again to operating speed with an auxiliary power source.

According to an embodiment of the invention, disclosed is a vehicle driven by a rotary power source, where the vehicle includes a flywheel adapted for rotation. The flywheel rotates about a vertical axis so that left and right turns of the vehicle are not affected by a gyroscopic effect of the rotating flywheel.

According to an embodiment of the invention, disclosed is a flywheel-driven vehicle that it easily incorporated into a standard differential driven vehicle.

According to an embodiment of the invention, disclosed is a dual flywheel where an outer shell-type flywheel stores kinetic energy and also functions as a mechanical shield to an inner flywheel that also stores kinetic energy. The flywheels can spin in the same or opposite directions.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which:

FIG. 4 is a top view of a flywheel-driven vehicle; and

FIG. 5 is a side cross-sectional view of an embodiment of a dual flywheel assembly.

DETAILED DESCRIPTION OF THE INVENTION

Figure 1:
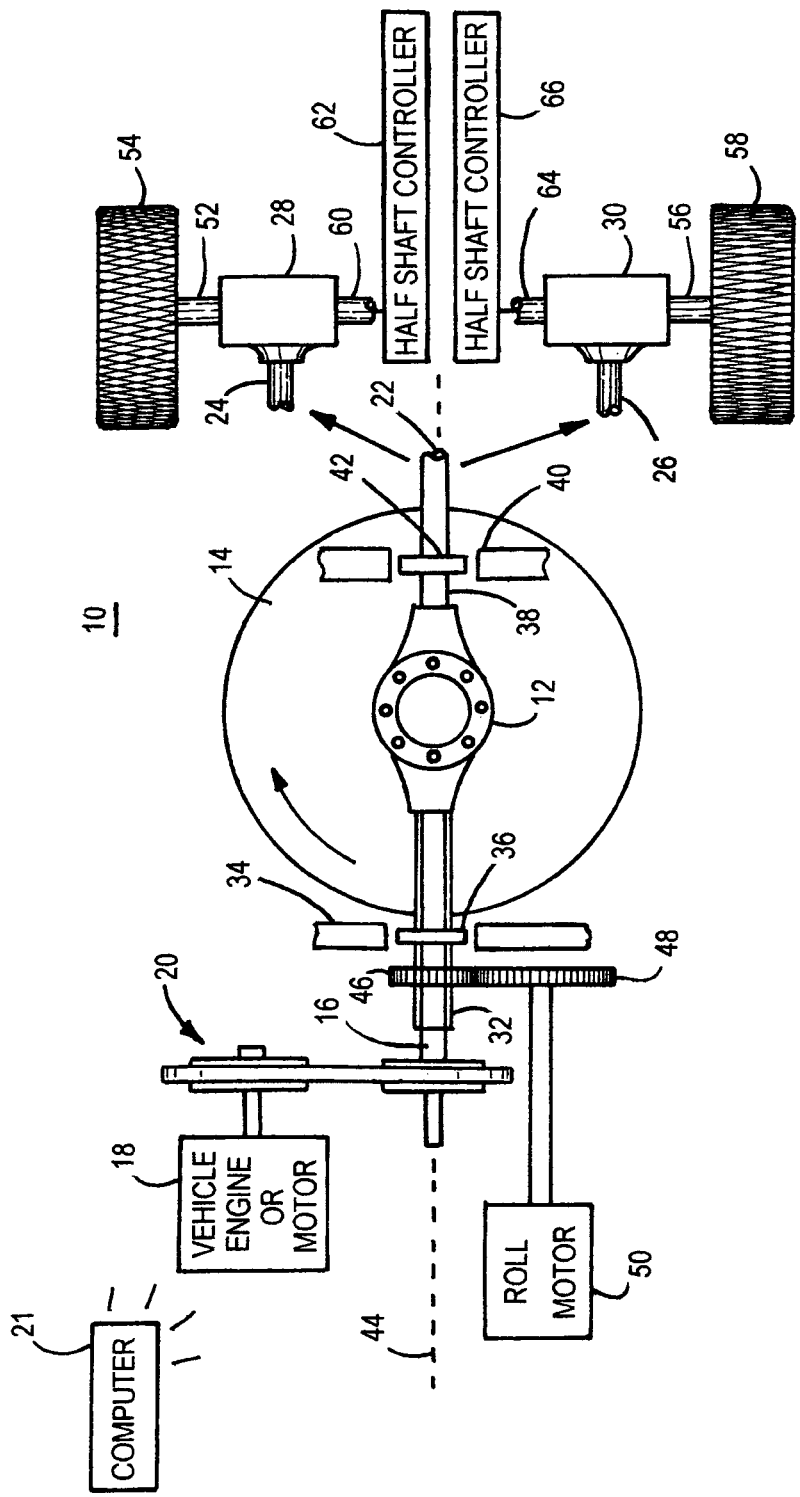
FIG. 1 is a top view of the drive train of a flywheel-equipped vehicle.

With reference to FIG. 1, there is illustrated an embodiment of the drive train 10 of a flywheel-equipped vehicle. The drive train 10 includes a main differential 12 of conventional construction. The main differential gear mechanism 12 includes a standard ring, pinion and spider gear. The main differential 12 includes a vertical drive shaft (not shown) connected to a flywheel 14. One half shaft 16 of the main differential 12 is connected to an engine 18 via a chain or belt and pulley system 20. The pulley system 20 can include a magnetic clutch that can be engaged to disconnect the engine from the drive train when, for example, slowing the vehicle down so that the engine is not attempted to be driven by the vehicle. Rather, when the vehicle is slowing down, the kinetic energy is captured and stored in the flywheel 14. Alternatively, the half shaft 16 can be driven directly by the engine 18 via a standard or automatic transmission. In hybrid type vehicles, the half shaft 16 can be driven either by an electrical motor or an internal combustion engine 18. Moreover, the half shaft 16 can drive a pair of differentials for the respective front wheels of the vehicle, much like the back wheels 54 and 58 to be described below. In this manner, either a front wheel drive vehicle is provided, or a four-wheel drive vehicle. The other half shaft 22 of the main differential 12 is connected to the drive shafts 24 and 26 of a second and third differential 28 and 30.

While the embodiment disclosed describes the utilization of one or more differential gear mechanisms, other multi-shaft mechanisms can be utilized, including sun and planet gear mechanisms, belt-drive mechanisms, and other multi-shaft gear and non-gear mechanisms that carry out similar functions. Plural multi-shaft mechanisms can also be employed, where each multi-shaft mechanism is connected to a flywheel.

The tubular housing 32 of the half shaft 16 is mounted to a support 34 via a bearing 36. Similarly, the tubular housing 38 of the other half shaft 22 is mounted to a support 40 via a bearing 42. Accordingly, and as will be described in more detail below, the entire main differential 12 can rotate about an axis 44 via the bearings 36 and 42. The angle of rotation of the main differential 12 about the axis 44 can be between about 5 degrees to about 45 degrees. Attached around the tubular housing 32 is a driven gear 46 that meshes with a drive gear 48. The drive gear 48 is driven by an electric roll motor 50, or other drive mechanism. Thus, when the roll motor 50 rotates the drive gear 48, the driven gear 46 also rotates and carries with it the entire main differential 12, as well as the flywheel 14.

As noted above, the half shaft 22 of the main differential 12 simultaneously drives the drive shafts 24 and 26 of both the second and third differentials 28 and 30. The drive connection between the main differential 12 and the second and third differentials 28 and 30 can be of the belt, gear or chain type or other suitable drive mechanism. In other words, there can be a direct drive relationship to the second and third differentials 28 and 30. The second differential 28 includes a half shaft 52 connected to a drive wheel 54 of the vehicle. Similarly, the third differential 30 includes a half shaft 56 connected to a drive wheel 58. The second differential 28 includes a control half shaft 60 connected to a half shaft controller 62. The third differential 30 includes a control half shaft 64 connected to a half shaft controller 66. The half shaft controllers 62 and 66 control the extent of the torque that is coupled from the main differential 12 to both wheels 54 and 58 via the respective second and third differentials 28 and 30, and controls the extent of the torque generated during deceleration of the vehicle that is transferred back to the flywheel 14. The controllers 62 and 66 can also be utilized to control the respective differentials 28 and 30 to reverse the direction of the vehicle, such as when pulling up to a parking space and then reversing to back into the parking space.

The rims and wheels 54 and 58 are of conventional design and mounted to the respective hubs of the rear axles 52 and 56. However, it is understood that each rear wheel assembly can include the differential and controller incorporated into a hub as a unit that is bolted to the vehicle. Such an assembly can be easily retrofit onto vehicles.

The flywheel 14 can be constructed of layers of metal discs bolted or welded together to achieve a desired size and weight. The flywheel 14 should be between about 18-48 inches in diameter, 1-4 inches thick and constructed of a strong and durable metal. Various materials with which the flywheel 14 can be constructed that are compatible with flywheel functions and safety include solid steel, lead, carbon fibers, water, or combinations thereof. Many other materials and parameters can be used in the fabrication of the flywheel 14. The total weight of the flywheel 14 can be between about 100 pounds and 800 pounds, or heavier, depending on the weight of the vehicle. However, it is known that with larger diameter flywheels and heavier flywheels, the torque generated will be correspondingly greater. It is expected that the flywheel 14 will rotate at a speed of about 2.5 times slower than the burst speed of the flywheel 14. The drive shaft (not shown) of the first or main differential 12 can be rigidly fixed to the flywheel 14 using mating mounting plates, one bolted or welded centrally to the flywheel 14 and the other to the splined portion of the drive shaft. Alternatively, the flywheel 14 can be connected to the vertical drive shaft of the main differential 12 by a clutch so that the two components can be connected or disconnected. The splined portion of the drive shaft extending from the main differential 12 can extend through mating splines formed in the center of the flywheel 14, and then the end of the splined drive shaft can be capped to keep the flywheel held vertically to the drive shaft. The weight of the flywheel 14 is supported by the drive shaft of the main differential 12, and thus thrust bearings can be used in the main differential 12 around the drive shaft to support the weight of the flywheel 14 during rotation. The thrust bearing can be lubricated or of the magnetic type.

In operation, the engine 18 of the automobile is started and the half shaft controllers 62 and 66 are controlled by a computer 21 to allow the half shafts 60 and 64 to freely rotate. As such, the wheels 54 and 58 are not driven, but the torque developed by the engine 18 is transferred to the rotation of the flywheel 14. The engine speed can be advanced above idle speed to facilitate the timely operational rotating speed of the flywheel 14. Indeed, the engine 18 can be controlled by the computer 21 to automatically control the rpm thereof, as well as control the half shaft controllers 62 and 66. The computer 21 can also control drive circuits to operate the DC motor 50 to initially rotate the differential 12 to assure that the flywheel 14 is level and horizontal. As will be described in more detail below, should the vehicle roll about the axis 44, such as going around a curve too fast, then the computer 21 can sense this and drive the DC motor 50 so that the main differential 12 and thus the flywheel 14 are rotated in an opposite direction to offset the forces that would otherwise allow the vehicle to roll uncontrollably and possibly off the road. A gyroscope roll sensor can be used by the computer 21 to provide a reference thereto, and once the roll of the vehicle is sufficiently different from the reference, the computer 21 can be used to produce a counter roll to the flywheel 14 in an attempt to maintain the vehicle level, or at the same angle of inclination as the road on which the vehicle is traveling.

Once the flywheel 14 has reached its operating speed, as determined by an rpm sensor attached to the flywheel 14, the operator can begin accelerating the vehicle by pushing on the gas or acceleration pedal. The computer 21 will sense the demand for acceleration and control the half shaft controllers 62 and 66 to slowly prevent rotation of the half shafts 60 and 64, whereupon the torque from both the engine 18 and the flywheel 14 is transferred to the vehicle wheels 54 and 58. The slow application of friction by a disc brake mechanism or other torque/speed control system to the half shafts 60 and 64 prevents the wheels 54 and 56 from spinning and losing traction. The disc brake mechanism can be driven by an electric, hydraulic or other drive mechanism. The computer 21 can be programmed to sense the speed at which the accelerator foot pedal is pushed to determine at what level the vehicle should be accelerated. For example, if the acceleration foot pedal is slowly pushed, then the half shafts 60 and 64 will be slowly brought to a halt so that the vehicle slowly accelerates from a stopped condition. On the other hand, when the operator quickly pushes on the foot pedal, then the computer 21 will sense this as a demand for fast acceleration, whereupon the half shaft controllers 62 and 64 will more quickly slow down and stop the half shafts 60 and 64 from initial rotating speeds. As noted above, the torque provided by the vehicle during acceleration is from both the engine 18 as well as the flywheel 14. With the flywheel 14 delivering a substantial amount of torque, the size of the engine 18 or motor can be correspondingly smaller, as it does not require as much energy to keep the vehicle going at the desired speed, as it does to accelerate the vehicle to such speed.

The computer 21 can receive inputs from a GPS system that provides information concerning numerous parameters such as the vehicle speed, the speed limit of the road or highway on which the vehicle is traveling, road curves and exits, stop signs and lights, altitude, etc. The GPS equipment can also alert the driver of the vehicle of the various battery-charging stations along the route, as well as fuel stations which dispense hydrocarbon fuels, propane gas natural gas, etc. As such, the computer 21 can use such information to control the equipment of the vehicle so that the energy available is used efficiently so that the vehicle reaches its destination, an alternate destination, or an intermediate recharging or refueling destination. For example, if the GPS system senses that the vehicle is climbing a hill, then the flywheel 14 can be employed to apply the kinetic energy to the drive train, and if the inclination is substantial, then the flywheel 14 can be spun up to a higher speed in advance of the steep inclination. In other words, with the incorporation of the GPS parameters into the computer 21, various conditions can be anticipated so that the equipment of the vehicle is placed in the optimum state to use the available energy efficiently, all transparent to the driver.

Once the vehicle has reached its speed as desired by the operator, then the operator will ease off the accelerator, which is sensed by the computer 21. The half shaft controllers 62 and 66 can be controlled to allow the half shafts 60 and 64 to rotate, even at the desired vehicle speed, to use the energy for other useful purposes. For example, the half shaft controllers 62 and 66 can be controlled to allow the engine 18 to not only drive the wheels 54 and 58 of the vehicle, but to also rotate the half shafts 60 and 64 to drive respective DC generators to charge onboard batteries. In some applications, the half shaft controllers 62 and 66 can incorporate motors therein to drive the wheels 54 and 58. The half shafts 60 and 64 can be selectively connected to other equipment that requires rotary power during operation of the vehicle. The different equipment that can be driven by the half shafts 60 and 64 can be selectively placed into operation and out of operation by electrically-operated clutches, where an input of multiple clutches is connected to the half shaft 60, and the output part of each clutch is connected to a different rotary load. When it is desired to simply control the rotational speed of the half shafts 60 and 64, or bring the same to a stop, hydraulically-operated disc brakes or other loads can be employed. A more efficient hydraulic feedback system to the flywheel 14 or wheel can also be employed. The computer 21 can respond to inputs and control the hydraulic cylinder or pump to apply the appropriate pressure to the brake pads to control the speed of the half shafts 60 and 64.

When the operator of the vehicle desires to slow down or stop the vehicle, the operator will ease off the accelerator pedal or apply the brakes. In both of these situations, the computer 21 will sense the easing off of the accelerator pedal or the application of the brakes, whereupon the computer 21 will control the half shaft controllers 62 and 66 to release or otherwise control the friction or load thereon. The rotating half shafts 60 and 64 will then allow the respective differentials 28 and 30 to couple the drive wheels 54 and 58 to the flywheel 14 to thereby speed it up. In other words, the flywheel 14 will become a load to the drive train and absorb the kinetic energy of the moving vehicle to thereby slow it down. Stated another way, the reduction in kinetic energy of the vehicle is thus transferred to kinetic energy of the rotating flywheel 14. The extent to which the kinetic energy of the vehicle is transferred to the flywheel 14 is determined by the amount by which the half shafts 60 and 64 are allowed to rotate. Braking of the vehicle occurs when the half shafts 60 and 64 are controlled to slow the vehicle as a function of vehicle speed, the flywheel speed, and deceleration rate of the vehicle. By employing the flywheel 14 to absorb excess energy from the vehicle, a substantial increase in efficiency is realized. The kinetic energy stored in the flywheel 14 can then be subsequently used to start or accelerate the vehicle, thus saving on-board electrical energy, hydrocarbon energy, or other sources of energy.

As noted above, the flywheel 14 can be rotated about the roll axis 44 to control the vehicle around turns, and the like. It should be noted that with the flywheel 14 located at or below the elevation of the wheel axles, the center of gravity of the vehicle is lowered for better dynamic stability. Moreover, the gyroscopic effect of the rotating flywheel 14 about a vertical axis does not affect the left or right turning of the vehicle. As noted in FIG. 2 below, the gyroscopic effect of the rotating flywheel 14 does resist any change in position of the vehicle about the vertical axis 70 of the flywheel 14. Thus, if the vehicle tends to roll about the horizontal axis 44, the gyroscopic effect of the flywheel 14 will resist such roll. This alone tends to keep the vehicle level or to maintain the orientation of the vehicle that presently exists. Thus, if the vehicle is racing around a banked oval track, the flywheel 14 will tend to maintain the bank angle of the vehicle on the track.

Figure 2A:
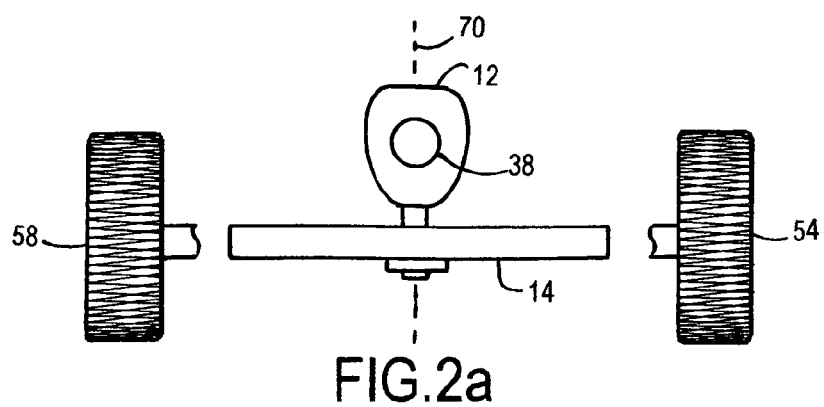
FIG. 2a is a view from behind a vehicle showing the orientation of the flywheel in typical operation.
Figure 2B:
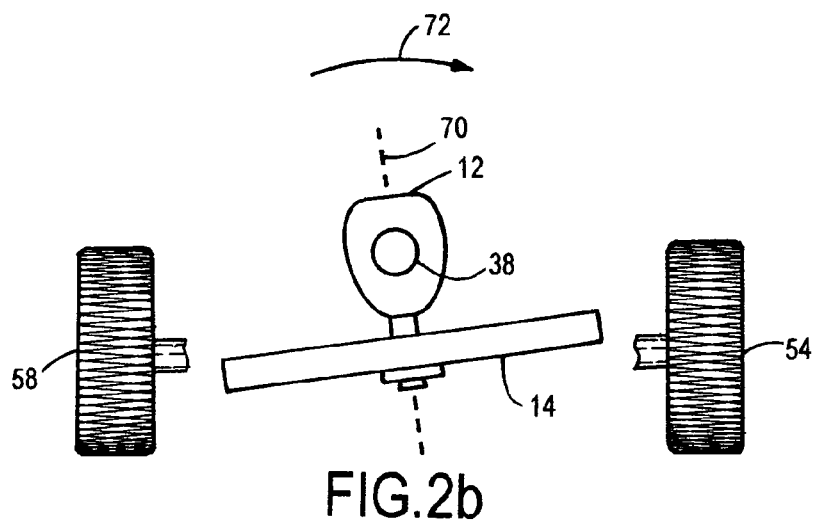
FIG. 2b is a view from behind a vehicle making a left turn and the orientation of the flywheel to counteract the roll tendencies of the vehicle.
Figure 2C:
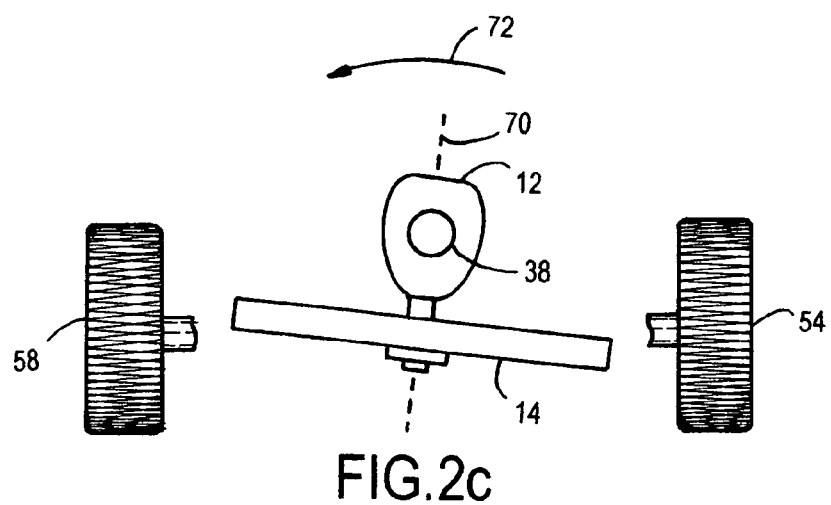
FIG. 2c is a view from behind a vehicle making a right turn and the orientation of the flywheel to counteract the roll tendencies of the vehicle.

FIGS. 2a-2c illustrate the manner in which the flywheel 14 can be rotated to counter the tendency of a vehicle to roll about a longitudinal axis as it turns a corner. The longitudinal axis 44 (FIG. 1) of a vehicle would be that that extends from a front bumper to a back bumper. FIG. 2a illustrates a situation where the vehicle is on level road and not involved in a turn. Here, the flywheel 14 is generally horizontal and parallel to the surface on which the vehicle is traveling. The direction of rotation of the flywheel 14 is not relevant to the general operation of the vehicle. Again, any turn of the vehicle to the left or right is not resisted by the rotating flywheel 14, as the orientation of the vertical axis 70 of the vehicle is not attempted to be changed. As will be described below, those skilled in the art can also use dual flywheels rotating in opposite directions to compensate for high torque applications.

With reference to FIG. 2b, there is illustrated a situation where the vehicle is experiencing a roll about the horizontal or longitudinal axis 44 (FIG. 1). The direction of the roll is shown by arrow 72. The drive wheel 58 is elevated above the ground to exaggerate the extent of the roll. With the use of suitable sensors, such as a roll sensor commercially available, the computer 21 will sense the situation and if the roll exceeds a predefined amount such that the normal gyroscopic effect of the rotating flywheel 14 does not counteract the roll 72, the computer 21 will cause the flywheel 14 to tilt in the opposite direction. In other words, the roll is seen in FIG. 2b as being clockwise (as viewed from the rear of the vehicle), and the roll or pivoting of the flywheel 14 is counterclockwise. The roll orientation of the flywheel 14 is dynamic and changes as a function of the current roll status of the vehicle. Thus, as the flywheel pivots counterclockwise it will tend to rotate the vehicle counterclockwise also, thus counteracting the clockwise roll 72 of the vehicle.

The roll axis of the flywheel 14 is controlled by the electric motor 50 (FIG. 1) which is connected to the drive gear 48 that meshes with the driven gear 46 connected to the tubular differential housing 32. From a home position in which the flywheel 14 is horizontal and level, the motor 50 can be actuated by the computer 21 to rotate in one direction and roll the entire main differential 12 in one direction, or be actuated to rotate in the other direction to roll the entire main differential 12 is the other direction. The entire main differential 12 is rotatably mounted to the vehicle by bearings 36 and 42. As can be appreciated, the flywheel 14 undergoes the same roll as the differential 12.

In FIG. 2c there is depicted a situation where the vehicle is encountering a counterclockwise roll shown by arrow 72. To counteract the counterclockwise roll of the vehicle, the computer 21 senses the same and causes the flywheel 14 to roll clockwise from a vertical axis, to the axis 70 as shown.

As is apparent from the foregoing, the flywheel 14 is a load on the engine 18 (or motor) when imparting the rotational kinetic energy thereto to spin it up to operating speed. When the flywheel 14 has been spun up to the desired rotational speed, the kinetic energy of the rotating mass of the flywheel 14 can be used to return the energy to the vehicle to accelerate it. During acceleration, there may come a point where the flywheel 14 has expended its useful energy to the vehicle, but further acceleration is required. If the flywheel 14 is no longer contributing energy to the acceleration of the vehicle, then the accelerating vehicle is not only the load on the engine, but the spent flywheel 14 remains a load which must be driven. In this instance, the flywheel 14 can be disconnected from the engine 18 and brought off line so that the load presented by the flywheel 14 is removed from the engine 18. The flywheel 14 can be connected to the main differential 12 by a friction clutch or the like that is controlled by the computer 21. The computer 21 can sense or monitor the energy of the flywheel 14 and if its speed has decreased sufficiently that it is no longer able to contribute to the acceleration of the vehicle, the computer 21 can electrically control the clutch to disconnect it from the main differential 12. With this arrangement, the engine 18 then has more power available to accelerate or maintain the speed of the vehicle. After the vehicle has accelerated to the desired speed, and the load on the engine is decreasing, the computer 21 can reconnect the flywheel 14 to the main differential 12 so that the engine 18 delivers energy to the flywheel 14 to spin it up to the operating speed.

Figure 3:
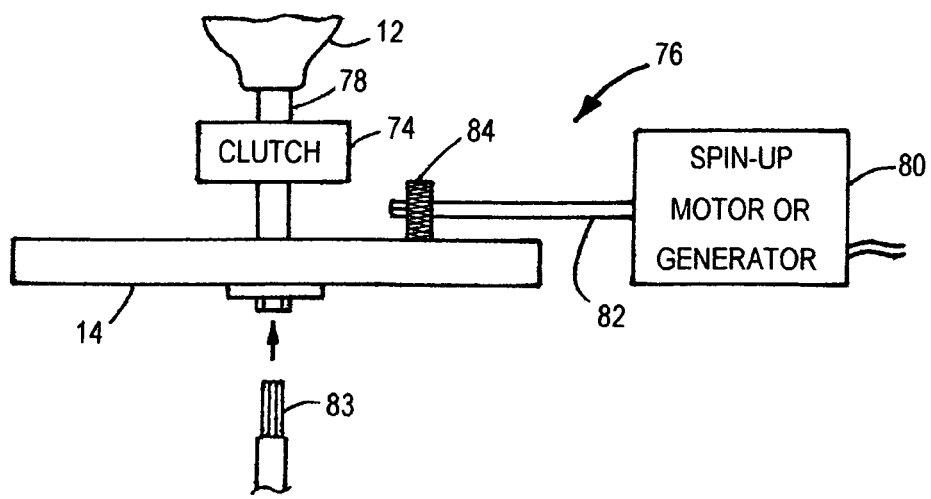
FIG. 3 is a side view of the flywheel and apparatus to drive the off-line flywheel during spin up operations.

As an alternative to the engine 18 driving the flywheel 14, other driving means can be provided to spin up the flywheel 14 to its operating speed to thereby free the engine 18 from such load. FIG. 3 illustrates auxiliary flywheel spin-up apparatus 76. Here, the flywheel 14 can be connected to the drive shaft 78 of the main differential 12 by a clutch 74 that is electrically operated by the computer 21. When the vehicle engine 18 is otherwise expending its available battery or hydrocarbon energy to accelerate or otherwise power the vehicle, the flywheel 14 can be disconnected from the drive train and separately powered to return the flywheel 14 to its operating speed or angular velocity. When the vehicle reaches its destination, the energy in the spinning flywheel 14 can be used to charge the on-board battery or to charge a bank of batteries located in the garage. The energy of a spinning flywheel 14 can also be used to spin up the flywheel of another vehicle leaving the garage. The hub on the bottom of the flywheel 14 can include a splined female receptacle into which a splined male shaft 83 can be inserted to mechanically transfer the kinetic energy from the flywheel 14 to other apparatus. For example, in a parking garage of the type having a conveyor for holding vehicles while parked, the conveyor can be equipped with a spinning splined male shaft 83 that is raised up and inserted into the splined receptacle of the spinning flywheel so that the flywheel 14 drives an external load. The angular velocity of the spinning flywheel 14 can be sensed to initially spin the splined shaft 83 at the same speed for engagement of the splined components. Similarly, an external torque can be applied to the splined shaft 83 to drive the flywheel 14 to spin it up to speed when the vehicle is leaving the parking garage or parking space.

The auxiliary power for spinning up the flywheel 14 can be a DC motor 80 controlled by the computer 21. The DC motor 80 is driven by the normal DC battery of the vehicle. The DC motor 80 is connected to a splined shaft 82 which can be moved radially along the flywheel 14. A rubber-rimmed friction wheel 84 is fastened to the end of the end of the shaft 82. The peripheral surface of the friction wheel 84 bears on the upper surface of the flywheel 14. While not shown, a mechanism is connected to the splined shaft 82 to move it axially while being rotated by the motor 80. The spin up mechanism 76 functions in a manner similar to the apparatus that propels some lawn mowers. This variable speed transmission technique can also be used for driving the wheels in lightweight vehicles.

When the computer 21 has sensed that the vehicle requires more acceleration than can be provided by the flywheel 14, such as when the energy of the flywheel 14 has been expended and thus becomes a load on the engine 18, the computer 21 operates the clutch 74 to disconnect the flywheel 14 from the differential 12 and take it off line. The computer 21 then moves the friction wheel 84 radially outwardly near the outer edge of the flywheel 14. At this position, the spin-up apparatus 76 is better able to rotate the flywheel 14. Alternatively, the computer 21 can sense the rpm of the flywheel 14 and position the friction wheel 84 at the proper radial location on the flywheel 14 to match the rotating speeds between the friction engaging surfaces. This reduces wear on the annular surface of the friction wheel 84. As the motor 80 imparts rotary energy to the flywheel 14, the location of the friction wheel 84 can be gradually moved toward the center of the flywheel 14 to thereby increase the speed of the flywheel 14. The spin up of the flywheel 14 can be accomplished off line and disconnected from the power train so as not to require energy therefrom. Indeed, the motor 80 can be employed periodically to maintain the rotational speed of the flywheel 14 when off line.

The flywheel spin-up mechanism shown in FIG. 3 can also be employed to apply rotary energy to the flywheel 14 during times the flywheel 14 is converting its kinetic energy to acceleration of the vehicle. In other words, when the flywheel 14 is providing energy for vehicle acceleration, the auxiliary mechanism can still be attempting to spin up the flywheel 14 to maintain its kinetic energy. The computer 21 can place the friction wheel 84 at the desired radius on the flywheel 14 in an attempt to provide rotary energy to the flywheel 14. The spin-up mechanism of FIG. 3 can also be used as a transmission for the vehicle to vary the speed of the vehicle, instead of using a standard gear or automatic transmission. For light weight vehicles, the engine or motor of the vehicle can drive the friction wheel 38, and each drive wheel of the vehicle can be connected to a rotating disc so that the speed of the rotating disc is a function of the radial distance the friction wheel 38 is placed on the rotating disc(s). Alternatively, the engine or motor can drive the discs and the wheels can be connected to respective friction wheels that are moved by the computer 21 radially on the discs.

During other times of operation of the vehicle, the flywheel 14 can be used to drive the motor 80 and thus use it as a generator to generate electrical energy. The generator 80 can then generate electricity to power the various components of the vehicle, or charge the battery. In order to conserve energy, when vehicle is parked and will not be used for a period of time, the energy of the spinning flywheel 14 can be used to drive the generator 80 to recharge the vehicle battery. In other words, rather than letting the flywheel 14 spin down and expend the energy thereof in bearing and wind friction, the kinetic energy can be used for other useful purposes. The flywheel can be equipped with a cover or housing to reduce wind friction and energy loss and for protection from debris and dirt. The cover can be sealed so that a small vacuum can be pulled to thus reduce the wind friction on the flywheel 14.

A substantial amount of energy can be stored in a rotating flywheel having a large mass. It can be appreciated that when the vehicle is at the end of its journey, the efficiency of the use of energy is increased by using all of the kinetic energy of the rotating flywheel 14, rather than letting it be dissipated by bearing friction and wind friction while the vehicle sits still and the driver is out of the vehicle. The kinetic energy of the flywheel 14 can be used by allowing it to drive the vehicle when it is close to its destination, rather than using the battery or hydrocarbon energy. In other words, when the vehicle is nearing its destination, as determined by the GPS system, the computer 21 will cause the vehicle to reduce the power provided by the battery-powered motor or hydrocarbon engine, and transfer the driving power to the flywheel 14. The computer 21 can be programmed with the weight of the vehicle and the distance to the destination, as well as other parameters, so that when the vehicle reaches the destination, all or substantially all of the kinetic energy of the flywheel 14 has been used and it is either rotating very slowly or stopped. The computer 21 can be programmed so that when the flywheel 14 has used all of its kinetic energy, and there is yet a short distance to the destination, the motor or engine of the vehicle can be again used to allow the vehicle to reach the destination. All of this would be transparent to the driver of the vehicle.

The conservation of the vehicle energy can also be achieved in another manner by using the kinetic energy of the flywheel 14 after the vehicle has reached its destination. When the vehicle has reached its destination and the flywheel 14 is still rotating at its operating speed, the kinetic energy can be retrieved from the flywheel 14 and converted to another form of energy. Parking garages can be equipped at each parking space with a mechanism that will contact the rotating flywheel 14 from underneath the vehicle and retrieve the kinetic energy to drive a generator or other load to convert the kinetic energy to another form of energy, such as electrical, thermal or other form of energy. The mechanism can be a friction wheel that comes into contact with the bottom surface of the rotating flywheel 14. The friction wheel can be spun up to an initial speed to match the angular speed of the flywheel 14 at the location of contact. Once contact is made between the flywheel 14 and the friction wheel, the friction wheel is connected to the load (generator) so that the kinetic energy of the flywheel 14 is converted to electrical energy by the generator. Eventually the generator load on the flywheel 14 will slow it down and stop. In the same manner described above, the radial location of the friction wheel on the flywheel can be continuously changed so that even though the flywheel 14 is slowing down, the rotational speed of the friction wheel remains the same. This would allow an AC generator to be driven by the friction wheel and produce a relatively constant frequency. The generator can produce electrical energy for charging batteries of vehicles, and other electrical loads. The amount of energy transferred from the rotating flywheel 14 can be measured and/or calculated and a credit can be given to the owner of the flywheel-operated vehicle. In addition to the foregoing, the parking lot or garage can spin up the vehicle flywheel 14 before the driver leaves. The flywheel 14 can be spun up just before the driver reaches the garage so that less waiting time is incurred. The spin up of the flywheel 14 can be accomplished in the same manner described above in connection with FIG. 3. When vehicles are parked on a conveyor system, or other parking apparatus, this presents an optimum opportunity to make external connections to the flywheel to impart or withdraw energy therefrom.

While FIG. 1 illustrates a two-wheel drive vehicle employing a flywheel and three differentials, those skilled in the art may find it easy to expand the principles and concepts of the invention to provide a four-wheel drive vehicle. A four-wheel drive vehicle could employ a separate flywheel and a differential associated with each of the additional two drive wheels. The mechanisms of the second and third differentials described above could be integrated directly into the drive wheel apparatus. Other versions can be achieved in view of the foregoing, such as the use of a separate flywheel for each drive wheel of the vehicle. In FIG. 1, separate flywheels can be attached to the respective differential shafts 24 and 26 and controlled by respective shafts 60 and 64.

With reference to FIG. 4, there is illustrated another embodiment of a vehicle employing a flywheel to supplement the power delivered by the vehicle motor or engine. The embodiment illustrated is preferred when reconfiguring or retrofitting a vehicle from a standard differential drive to a flywheel assisted drive. Here, the vehicle is equipped with a conventional differential 90 that is driven by the main differential 12. The half shafts of the conventional differential 90 drive respective drive wheels 54 and 58. The conventional differential 90 is connected to a half shaft 22 of the main differential 12 via a U-joint 92. The conventional differential 90 is driven either by the vehicle engine/motor arrangement 18, or the flywheel 14, depending on the control of the computer 21. During those periods of time when the acceleration of the vehicle is not assisted by the flywheel 14, the engine/motor 18 drives the conventional differential 90 via the main differential 12. When it is desired to allow the flywheel 14 to transfer the kinetic energy thereof to the conventional differential 90, the half shaft 16 can be controlled accordingly. When it is desired to spin up the flywheel 14 to an operating speed, the drive wheels 54 and 58 can be braked under control of the computer 21. This allows the rotary driving force of the engine/motor 18 to be transferred via the main differential 12 to the flywheel 14. As noted above, the flywheel 14 can be coupled by a clutch to the main differential 12. The main differential 12 can also drive an electric motor, hydraulic pump, generator, or other apparatus.

FIG. 5 illustrates a dual flywheel assembly 96 having a first outer flywheel 98 and a second inner flywheel 100. The outer flywheel 98 is in the form of a shell or housing that houses and covers the inner flywheel 100. To that end, the outer flywheel 98 functions as a protective shield to the inner flywheel 100 so that if the latter bursts, the resulting pieces are contained within the outer flywheel 98. The drive shaft 102 of the outer flywheel 98 is connected to a gear box 106, as is the drive shaft 104 of the inner drive wheel 100. The gear box 106 is constructed with an arrangement of gears so that when a main drive shaft 108 is driven in a given direction, the flywheels 98 and 100 rotate in opposite directions. When the flywheels 98 and 100 are rotated in opposite directions, there is less tendency of the vehicle to roll around the axis 70 when subjected to substantial accelerations. The flywheels 98 and 100 can be constructed of the same or different materials and have the same or different weights.

While not shown, the flywheel 14 can be constructed with permanent magnets fastened or embedded in the peripheral edge thereof, or on any other rotating surface of the flywheel 14. The permanent magnets of the rotating flywheel 14 can pass by corresponding stationary wires so that currents are induced in the wires. The currents in the windings of the wires can be rectified to produce a DC current for charging batteries, or for conversion to other forms of energy. To that end, the flywheel 14 can be part of an electrical generator for generating electrical energy as well as for storing kinetic energy. Conversely, currents can be passed though the stationary windings in a timed manner to create magnetic fields that react with the permanent magnets of the rotating flywheel 14 to produce a rotary force on the flywheel 14. In this manner, the flywheel 14 functions as part of an electrical motor for driving itself to produce kinetic energy. The computer 21 can configure the flywheel 14 to function as either a motor or a generator, at different times. The flywheel 14 can be configured as a motor when it desired to spin up the flywheel to the operating speed, or assist in maintaining the momentum of the flywheel during periods of vehicle acceleration. The flywheel 14 can be configured as a generator when the remaining kinetic energy of the flywheel 14 is to be dissipated and used as useful energy, such as when the vehicle has reached its destination and has been parked.

From the foregoing, disclosed are many features of a flywheel driven vehicle. The flywheel can be carried and rotated by a conventional differential. One half shaft of the main differential is driven by the vehicle engine and the other half shaft of the main differential drives the respective drive shafts of a pair of other differentials. Each differential of the pair drives a drive wheel of the vehicle via respective half shafts. The other half shafts of the pair of differentials are controlled by a computer to control the amount of power transferred from the engine to the drive wheels during acceleration, and to control the power from the flywheel transferred to the drive wheels during higher accelerations, and to transfer power from the vehicle drive wheels during deceleration to the flywheel. According to another feature, the flywheel can be tilted during roll tendencies of the vehicle to counteract the same. A further feature is that the flywheel can be taken off line and spun up by a separate power source so that the power of the vehicle engine can be used to accelerate the vehicle.

While the principles and concepts of the invention have been described in connection with driving a vehicle, such as a passenger automobile or truck, the features of the invention can be employed with equal effectiveness to other apparatus. For example, a railroad train can utilize the flywheel for each wheel of each car to assist in starting each car when moving the train ahead from a stopped condition, as well as slow down or stop the train by using the kinetic energy of the car to spin up the flywheels, thus reducing wear on the brakes.

While the preferred and other embodiments of the invention have been disclosed with reference to specific vehicle flywheel embodiments, and associated methods thereof, it is to be understood that many changes in detail may be made as a matter of engineering choices without departing from the spirit and scope of the invention, as defined by the appended claims.

What is claimed is:

1. Apparatus for a vehicle driven by a rotary power source, comprising:
    a flywheel adapted for rotation, said flywheel rotating about a vertical axis so that left and right turns of the vehicle are not affected by gyroscopic effects of the rotating flywheel, where the flywheel is operatively coupled to the vehicle to accelerate the vehicle;
    a main multi-shaft mechanism having a pair of half shafts and a drive shaft, one said half shaft driven by the rotary power source, and another said half shaft for driving drive wheels of the vehicle; and
    a drive shaft of said main multi-shaft mechanism connected to said flywheel for driving said flywheel and for being driven by said flywheel.

2. The apparatus of claim 1, further including a pair of multi-shaft mechanisms driven by respective drive shafts, each said main multi-shaft mechanism of said pair having two half shafts and a drive shaft, one half shaft of a first main multi-shaft mechanism of said pair of main multi-shaft mechanisms connected to drive a first drive wheel, one half shaft of a second multi-shaft mechanism of said pair of multi-shaft mechanisms connected to drive a second drive wheel, and a half shaft of said main multi-shaft mechanism driving the drive shafts of both said multi-shaft mechanisms of said pair of multi-shaft mechanisms.

3. The apparatus of claim 1, further including one or more bearings for mounting said main multi-shaft mechanisms for pivotal movement, whereby said flywheel pivotally moves with pivotal movement of said main multi-shaft mechanism.

4. The apparatus of claim 3, further including a driven gear externally attached to said main multi-shaft mechanism, and a motor connected to a drive gear, where said drive gear meshes with said driven gear so that the motor can be actuated to pivotally move said main multi-shaft mechanism.

5. The apparatus of claim 4, further including a program controlled computer and a sensor for sensing roll characteristics of the vehicle, and wherein said program controlled computer controls the pivotal movement of said flywheel as a function of the roll characteristics of the vehicle.

6. The apparatus of claim 3, wherein said main multi-shaft mechanism includes a half shaft enclosed by a tubular housing, and said bearing is mounted around said tubular housing.

7. The apparatus of claim 6, further including a computer for controlling one or more brakes as a function of the energy to be transferred to and from said flywheel.

8. The apparatus of claim 6, further including a generator connectable to at least one said control half shaft so that rotary movement thereof drives said generator.

9. The apparatus of claim 2, wherein each said multi-shaft mechanism of said pair of multi-shaft mechanisms includes a control half shaft, and further including a respective brake associated with the control half shaft of each multi-shaft mechanism of said pair of multi-shaft mechanisms.

10. The apparatus of claim 1, further including an auxiliary power source for spinning up said flywheel, and a clutch for connecting and disconnecting said flywheel with respect to said main multi-shaft mechanism, and a computer for controlling said clutch so that said flywheel can be taken off line and spun up by said auxiliary power source.

11. The apparatus of claim 10, further including a drive wheel connected to said auxiliary power source, where said drive wheel is frictionally engaged with said flywheel.

12. The apparatus of claim 11, further including a mechanism to move the drive wheel radially along a surface of said flywheel.

13. Apparatus for a vehicle driven by a rotary power source, comprising:
- at least one drive wheel for moving said vehicle on a ground surface;
- a source of power for accelerating the vehicle;
- a flywheel having a mass and when spinning providing sufficient energy to accelerate the vehicle;
- a main multi-shaft mechanism having a drive shaft, a first half shaft and a second half shaft;
- said source of power driving said first half shaft;
- said drive shaft of said main multi-shaft mechanism connected to said flywheel to spin said flywheel when the first half shaft of said main multi-shaft mechanism is driven by said source of power; and
- said second half shaft of said main multi-shaft mechanism for driving said at least one drive wheel.

14. The apparatus of claim 13, further including a wheel multi-shaft mechanism having a drive shaft, a first half shaft and a second half shaft, the first half shaft of said wheel multi-shaft mechanism for driving said drive wheel, the drive shaft of said wheel multi-shaft mechanism driven by the second half shaft of said main multi-shaft mechanism, and the second half shaft of said wheel multi-shaft mechanism connected to a controller for controlling a rotational speed of said second half shaft.

15. The apparatus of claim 14, wherein said wheel multi-shaft mechanism comprises a first wheel multi-shaft mechanism and said drive wheel comprises a first drive wheel, and further including a second wheel multi-shaft mechanism and a second drive wheel, said second wheel multi-shaft mechanism having a drive shaft, a first half shaft and a second half shaft, the first half shaft of said second wheel multi-shaft mechanism for driving said second drive wheel, the drive shaft of said second wheel multi-shaft mechanism driven by the second half shaft of said main multi-shaft mechanism, and the second half shaft of said second wheel multi-shaft mechanism connected to a controller for controlling a rotational speed of the second half shaft of said second wheel multi-shaft mechanism.

16. The apparatus of claim 13, wherein said first and second half shafts of said main multi-shaft mechanism are collinear with an axis, and further including means for rotating the main multi-shaft mechanism about said axis to thereby pivot said flywheel about said axis.

17. The apparatus of claim 13, wherein said main multi-shaft mechanism comprises one of a differential having a ring, pinion and spider gear, or a planetary gear system having sun and planetary gears.

18. A method of accelerating a vehicle with a flywheel, comprising:
- using rotary energy of a power source to drive a first shaft of a main multi-shaft mechanism;
- using the rotating energy of the first shaft of the main multi-shaft mechanism to drive a second shaft of the main multi-shaft mechanism to spin a flywheel connected to said second shaft; and
- using the rotating energy of the first shaft of the main multi-shaft mechanism to drive a third shaft of the main multi-shaft mechanism for driving at least one wheel of the vehicle.

* * * * *